United States Patent

[11] 3,572,840

[72] Inventor Ralph A. Fletcher
  Bedford, N.H.
[21] Appl. No. 809,282
[22] Filed Mar. 21, 1969
[45] Patented Mar. 30, 1971
[73] Assignee H. E. Fletcher Co.
  Westford, Mass.

[54] MEANS FOR APPLYING WEDGING FORCE TO MINERAL AND OTHER BODIES
3 Claims, 9 Drawing Figs.

[52] U.S. Cl. ................................................... 299/23
[51] Int. Cl. ..................................................... E21c 37/04
[50] Field of Search .......................................... 299/22, 23

[56] References Cited
UNITED STATES PATENTS
1,008,818  11/1911  Harris .......................... 299/23
2,328,661  9/1943  Maloney ....................... 299/23

Primary Examiner—Ernest R. Purser
Attorney—Munroe H. Hamilton

ABSTRACT: A reciprocating wedge device of the plug and feather class consists in a pair of wedge feathers and a wedge plug for use in a drilled hole. The wedge feathers are formed with inner recessed surfaces defined by spaced apart dovetailed edges. The recessed surfaces provide slideways for the wedge plug which has two opposite sides formed in tapered relationship to one another so that when the tapered sides are slidably advanced inwardly along the recessed surfaces, the wedge feathers are driven apart and exert splitting forces within the drilled hole. The two remaining edges of the wedge plug are further formed with dovetailed portions complementary to the dovetailed edges of the wedge feathers to allow the wedge plug to hold the wedge feathers in adjustably interlocked relationship and to draw them together when the wedge feathers and wedge plug are withdrawn from the drilled hole.

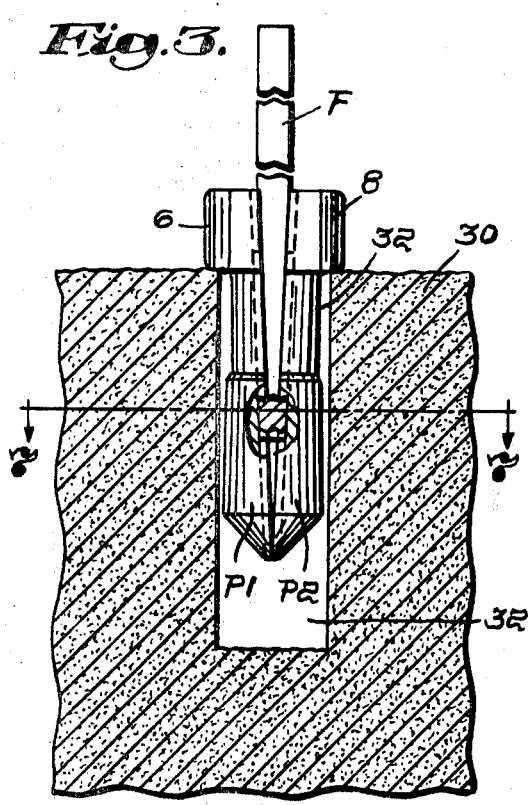
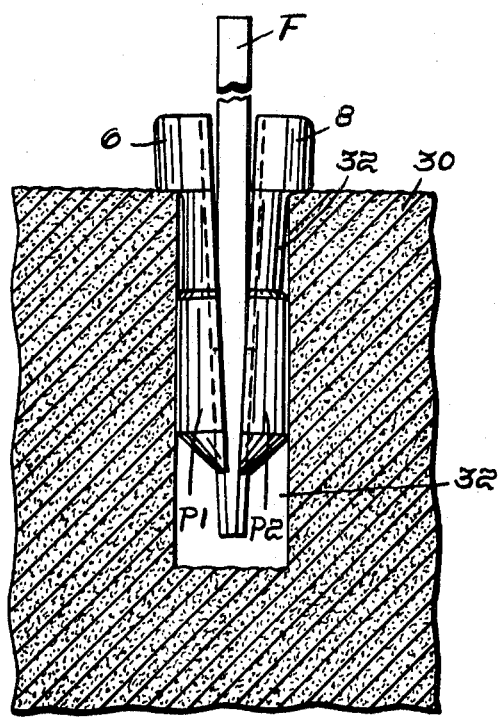
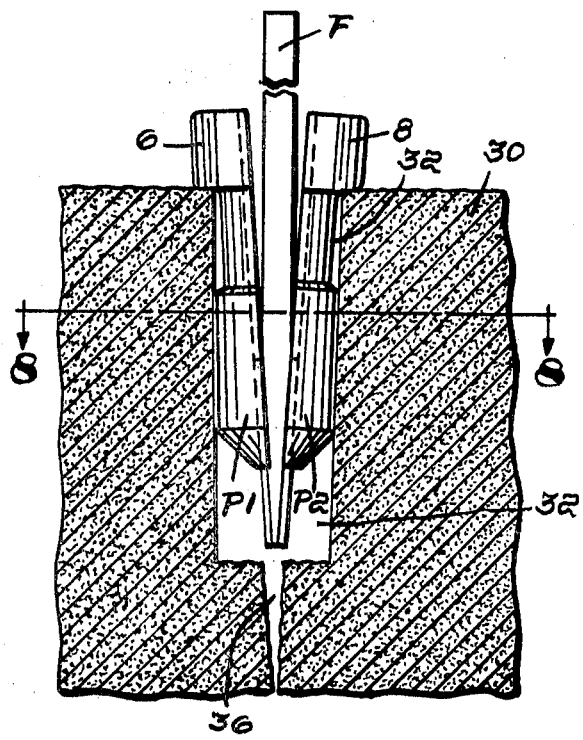
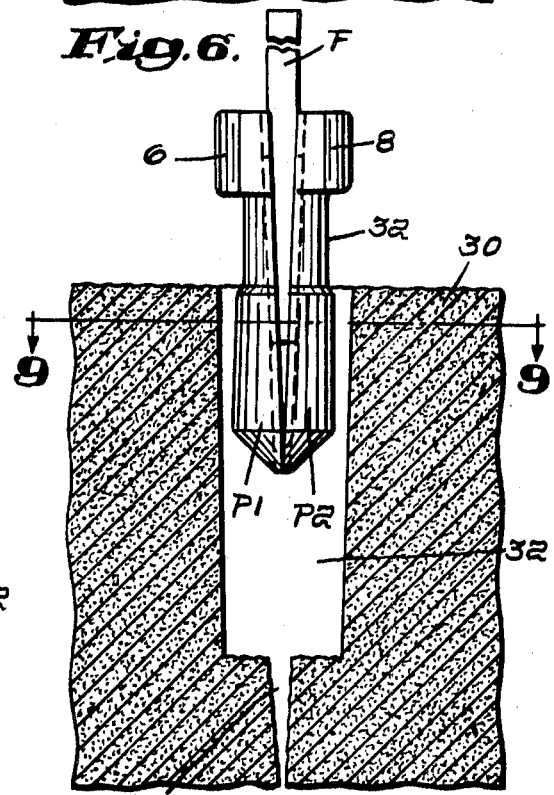

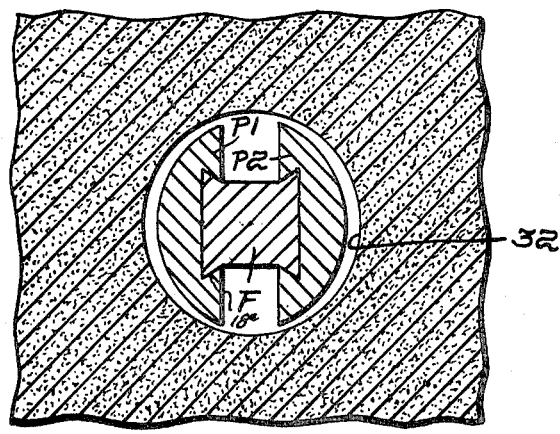
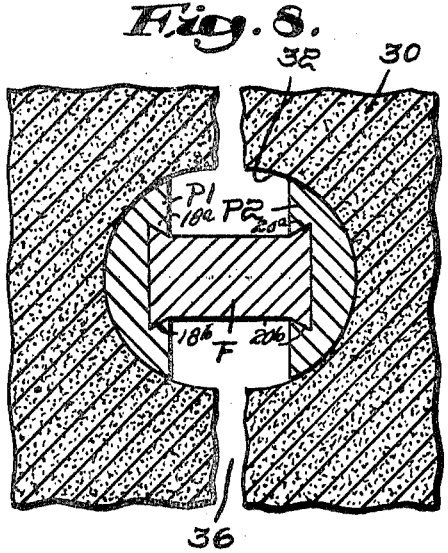
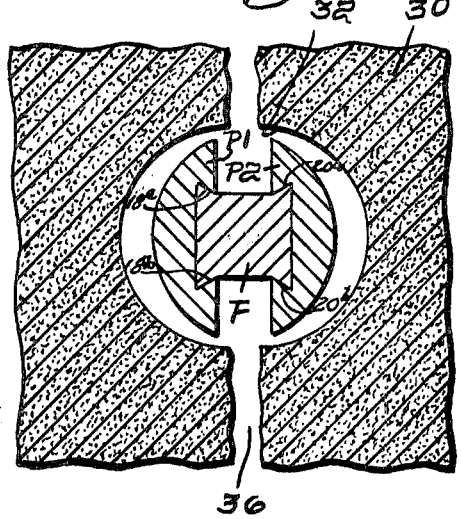

MEANS FOR APPLYING WEDGING FORCE TO MINERAL AND OTHER BODIES

This invention relates to means for applying wedging forces to bodies of various classes and in particular the invention is concerned with method and means for splitting mineral bodies such as granite and the like.

In conventional methods of splitting mineral bodies, for example, as carried out in the dimension stone processing art, it is customary to employ wedge devices of various types, and one common type is a composite wedge assembly made up of two wedge feathers and a wedge plug. A common practice is to drill a number of holes along a desired line of splitting. Into these holes are dropped a plurality of the wedge devices. The wedge plugs are then successively driven to force respective wedge feathers apart and exert substantial splitting forces acting progressively along the rock body.

A problem arises in using wedges of this type when the splitting is to be carried out along a vertically extending line, for example, in a vertical face of stone in a quarry. Vertically spaced holes have to be drilled to project inward in a horizontally directed manner and the component parts of the wedge devices cannot be satisfactorily held in place and will fall out of the holes as splitting occurs with these component parts being separated or damaged.

A definite need, therefore, exists for a practical form of reciprocating wedge device which can be moved into and out of a drilled hole without separation of its component parts.

With the foregoing problem and need in mind, I have conceived an improved form of reciprocating wedge device of the plug and feather type in which the component parts of the wedge device are held in adjustably interlocked relationship so that these parts cannot fall away from one another or become separated when the wedge device is withdrawn from a drilled hole.

An important object of the invention, therefore, is to provide an improved wedge device for use in drilled holes, and to devise an improved form of reciprocating wedge device of the composite wedge plug and wedge feather class, wherein the wedge components may be constantly held in adjustably interlocked relationship during both a wedging operation and at such time as the wedge parts are being withdrawn from a drilled hole after splitting has been carried out.

Still another object is to devise a combination of wedge feathers and a wedge plug whose adjoining surfaces are constructed with a special dovetailed formation by means of which the wedge feathers may be readily forced apart when the plug is driven inwardly and yet the wedge feathers may be drawn together when the plug is retracted.

The nature of the invention and its other objects and novel features will be more fully understood and appreciated from the following description of a preferred embodiment of the invention selected for purposes of illustration and shown in the accompanying drawings, in which:

FIG. 3 is a fragmentary cross-sectional view showing a rock with a drilled hole and the wedge device of the invention inserted in the hole in position to be forced apart by a wedge feather;

FIG. 4 is a view similar to FIG. 3 but further illustrating the wedge feathers being forced into contact with the sides of the drilled hole with the wedge plug having been advanced;

FIG. 5 is a view similar to FIGS. 3 and 4 but illustrates the wedge plug driven into a position to cause splitting in the rock body;

FIG. 6 is a view similar to FIGS. 3, 4 and 5, but illustrating the wedge plug retracted and carrying with it the wedge feathers in interlocked relationship;

FIG. 7 is a cross section taken on the line 7-7 of FIG. 3;

FIG. 8 is a cross section taken on the line 8-8 of FIG. 5; and

FIG. 9 is a cross section taken on the line 9-9 of FIG. 6.

Figure 1:
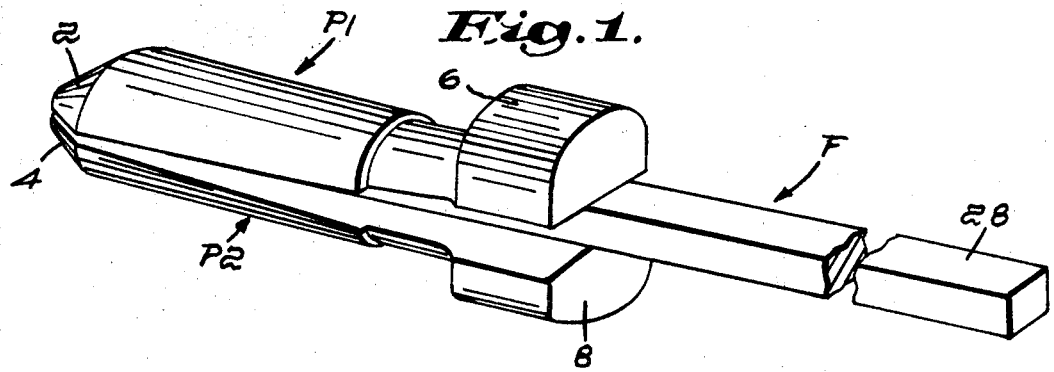
FIG. 1 is a perspective view illustrating my improved wedge device in a fully assembled position ready to be inserted in a drilled hole.
Figure 2:
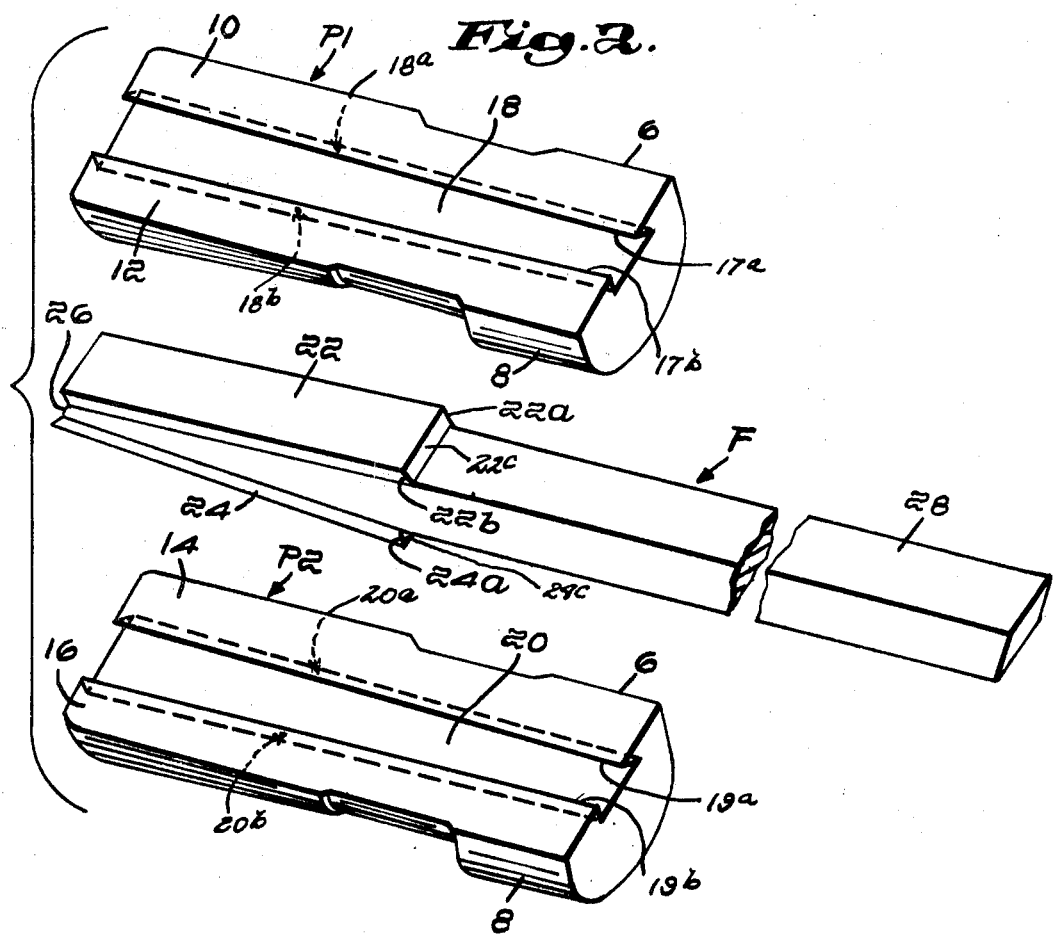
FIG. 2 is an exploded view of the structure shown in FIG. 1.

Referring more in detail to the drawings, attention is directed to FIGS. 1 and 2 wherein I have illustrated the reciprocating wedge device of the invention as being comprised by three component parts including two wedge feathers P1 and P2 and a wedge plug F.

In the preferred form shown in these FIGS., wedge feathers P1 and P2 are of a somewhat semicylindrical shape and have rounded outer bearing surfaces for use in a drilled hole in rock to exert splitting forces. It should be understood, however, that the invention is not limited to wedge plugs of any particular outer shape or contour and the feathers may be used in exerting wedging forces against any desired body, as, for example, to produce displacement as well as splitting.

As used in drilled holes each of the wedge feathers P1 and P2 may be further formed by tapered-entering tip portions 2 and 4, respectively, to make up a conical-shaped tip as indicated in FIG. 1. Opposite extremities of the wedge feathers P1 and P2 are enlarged to form annular collar portions 6 and 8, respectively. These collar portions are designed to act as holding elements for limiting the extent to which the feathers may be inserted into a drilled hole as may be seen in FIG. 3.

Each of the wedge feathers P1 and P2 are further formed in a novel manner with spaced inner flat faces which extend from the entering tips 2 and 4 towards the respective collar portions 6 and 8 and these faces taper away from one another as may be seen in FIG. 1. Thus feather P1 is designed with tapered flat faces 10 and 12 and feather P2 is formed with tapered flat surfaces 14 and 16.

Lying between the tapered flat surfaces in each feather member are recessed slide surfaces including a recessed slide surface 18 in P1 and a recessed slide surface 20 in P2. The slide surfaces 18 and 20 are defined by dovetailed surfaces 18a and 18b in feather P1 and 20a and 20b in feather 2, and these surfaces meet with respective surfaces 10, 12, 14 and 16 to define edges 17a and 17b and 19a and 19b. The surfaces are constructed with the edges 17a and 17b made to converge slightly toward one another as they approach collar 8, and likewise the edges 19a and 19b converge as they approach collar 8.

The wedge plug F is constructed to move along these slide surfaces and to be contained in a predetermined manner. For this purpose, the wedge plug is made with two tapered sides 22 and 24 and these tapered sides extend from a relatively narrow tip portion 26 towards a driving end portion 28 of the wedge plug. The tapered side 22 is further defined by complimentary dovetailed edges 22a and 22b which are made slightly smaller than the tapered surfaces 18a and 18b, while the tapered side 24 is made with dovetailed edges as 24a, FIG. 2, which are complimentary with, but slightly smaller, than the parts 20a and 20b.

As a result of this double tapered arrangement and the slight difference in size described above, the wedge plug can move in one direction to force the wedge feathers apart for an appreciable distance and thus exert wedging forces. However, when the wedge plug is retracted, it can move through only a limited path of travel and then comes into locked engagement with each of the converging edges of the wedge feathers so that the whole unit may then be withdrawn as one secured assembly.

In FIGS. 3—9 inclusive, I have illustrated my reciprocating wedge employed in a typical rock splitting operation and as indicated therein, No. 30 denotes a rock body which is to be subjected to splitting force exerted through drilled holes such as the drilled hole 32.

As suggested in the FIGS. 3—7, the wedge device shown in FIG. 1 is inserted in the hole 32 with the collar portions 6 and 8 engaged against the rock body 30 in a position such that the parts P1 and P2 lie close to the inner surface of the drilled hole 32.

Thereafter the wedge plug F as shown in FIG. 4 is driven downwardly by hammering or other suitable means to move the wedge feathers P1 and P2 apart from one another and to force these wedge feathers against opposite sides of the hole.

Hammering or other driving forces are continued until such time as a split occurs in the rock body 30, as suggested in FIGS. 5 and 8 and denoted by the numeral 36.

During this operation, it will be observed that the tapered tip of the wedge plug is forced downwardly to a point where it may project below the conical tip of the wedge feathers, and it will also be observed from an inspection of FIGS. 7, 8 and 9 that the tapered sides and dovetailed edges of the plug F are at all times held in sliding contact with respective slide surfaces and dovetailed edges of members P1 and P2.

Thus it will be apparent that when the device is withdrawn from the hole as illustrated in FIGS. 6 and 8, the plug F tends to move upwardly relative to the wedge feathers P1 and P2. Simultaneously because of the double tapered arrangement described which holds the three parts in adjustably interlocked relationship, the wedge feathers are drawn towards one another as indicated in FIG. 9 and the several parts can then be withdrawn as a unit irrespective of the position in which the wedge device may be disposed.

Movement of the plug F upwardly relative to the wedge feathers is limited by reason of the fact that when the wedge feathers are drawn together sufficiently to engage against one another at the conical tip portions, as shown in FIG. 3, the wedge plug edges 22a and 22b will jam against converging tapered edges 17a and 17b, and the opposite edges 24a of the wedge plug, of which only one is shown in FIG. 2, will likewise jam against edges 19a and 19b, and the components become firmly interlocked against one another and can be removed and handled as a unit for insertion in another drilled hole when desired.

While I have shown a preferred embodiment of my invention, it will be understood that the shape and general arrangement of the parts may be varied in any desired manner, and likewise, the wedge may be used to exert displacing forces in various wedging operations in addition to the rock-splitting function described as a preferred embodiment.

I claim:

1. A reciprocating wedge device of the plug and feather class including two wedge feathers and a wedge plug slidably received between the feathers, said wedge plug being of rectilinear cross section and having two opposite parallel sides and two other opposite tapered sides whose edges present beveled surfaces which intersect the said first two opposite sides, each of said feathers being formed with outer wedging surfaces which are conically tapered from their lower ends upwardly, each of said feathers further having inner sides which are straight in a vertical direction, said inner sides being recessed to form dovetailed slideways for slidably receiving the tapered sides of the plug and their beveled edges, said tapered sides being adjustable in the dovetailed slideways to move the feathers apart from one another and exert selectively applied wedging forces through the conically tapered lower ends of the feathers when the plug is driven downwardly.

2. A structure according to claim 1 in which the angles of inclination of the tapered plug sides are formed in relation to the length of the feathers and their dovetailed slideways to provide for retracting the wedge plug and drawing the feathers together into a position in which the feathers and plugs are releasably locked together.

3. A structure according to claim 1 in which the feathers are formed with collar portions which extend radially outwardly from the upper ends of the conically tapered feathers.